(12) United States Patent
DuBois et al.

(10) Patent No.: US 11,193,521 B2
(45) Date of Patent: Dec. 7, 2021

(54) KIT FOR MECHANICALLY COUPLING A ROD TO A CERAMIC ELEMENT

(71) Applicant: VESUVIUS FRANCE S.A., Feignies (FR)

(72) Inventors: Laurent DuBois, Rousies (FR); Etienne Schabaillie, Trith Saint Leger (FR)

(73) Assignee: VESUVIUS FRANCE S.A., Feignies (FR)

( * ) Notice: Subject to any disclaimer, the term of this patent is extended or adjusted under 35 U.S.C. 154(b) by 192 days.

(21) Appl. No.: 16/487,158

(22) PCT Filed: Mar. 16, 2018

(86) PCT No.: PCT/EP2018/056698
§ 371 (c)(1),
(2) Date: Aug. 20, 2019

(87) PCT Pub. No.: WO2018/167282
PCT Pub. Date: Sep. 20, 2018

(65) Prior Publication Data
US 2020/0056646 A1    Feb. 20, 2020

(30) Foreign Application Priority Data
Mar. 17, 2017 (EP) ..................... 17161719

(51) Int. Cl.
*F16B 21/16* (2006.01)
*F16D 11/16* (2006.01)
(Continued)

(52) U.S. Cl.
CPC ............ *F16B 21/165* (2013.01); *F16D 11/16* (2013.01); *F16B 1/00* (2013.01); *F16B 2001/0085* (2013.01); *F16D 2011/004* (2013.01)

(58) Field of Classification Search
CPC .................. F16B 21/165; F16B 19/109; F16B 2001/0085; F16B 7/1409; F16B 7/1427;
(Continued)

(56) References Cited

U.S. PATENT DOCUMENTS 3,923,150 A * 12/1975 Jager ...................... B65G 13/10
198/780
3,942,338 A * 3/1976 Furlette ................ B65G 13/071
464/34

(Continued)

FOREIGN PATENT DOCUMENTS

CN    101952085 A    1/2011
EP    1693635 A1    8/2006

*Primary Examiner* — Victor D Batson
*Assistant Examiner* — Amit Singh Dhillon
(74) *Attorney, Agent, or Firm* — Parthiban A. Mathavan

(57) ABSTRACT

A kit of parts includes a ceramic element comprising a cylindrical bore having at least one recess, and a rod comprising an outer tube comprising a jutting portion adjacent to an insert portion. An outer tube wall mates with the cylindrical ceramic bore. An outer tube bore comprises a cylindrical portion. An outer tube projecting member is insertable into a recess in the cylindrical bore. An inner mandrel insertable into the outer bore stabilizes a projecting member in a recess to couple the rod to the ceramic element.

15 Claims, 8 Drawing Sheets

(51) Int. Cl.
 *F16B 1/00* (2006.01)
 *F16D 11/00* (2006.01)

(58) Field of Classification Search
 CPC .......... F16B 7/1436; F16B 1/00; B65G 39/02; B65G 39/04; B65G 39/07; F27B 9/24; F27D 3/026; C03B 35/186; F16D 2011/004; F16D 11/16; F16D 7/10; Y10T 403/7075
 USPC .................................. 411/347, 348; 464/35
 See application file for complete search history.

(56) References Cited

U.S. PATENT DOCUMENTS

| | | | | |
|---|---|---|---|---|
| 3,979,925 | A * | 9/1976 | Kato | F16D 7/10 464/35 |
| 4,056,953 | A * | 11/1977 | Furlette | B65G 13/071 464/34 |
| 4,850,774 | A * | 7/1989 | Weaver | F16B 39/04 411/298 |
| 4,938,622 | A * | 7/1990 | Stoerzbach | B02C 17/16 403/2 |
| 5,141,355 | A | 8/1992 | Stillwagon | |
| 5,370,596 | A * | 12/1994 | Compagnon | B65G 39/02 29/450 |
| 5,695,675 | A | 12/1997 | Labod | |
| 5,906,567 | A * | 5/1999 | Gautier | C03B 35/186 492/16 |
| 7,473,049 | B2 * | 1/2009 | Holowczak | F16D 1/027 403/272 |
| 8,869,372 | B2 | 10/2014 | Luneau et al. | |
| 2008/0247814 | A1 * | 10/2008 | Hageman | F16B 19/109 403/322.2 |
| 2010/0126823 | A1 * | 5/2010 | Gautier | B65G 39/00 193/37 |
| 2013/0149031 | A1 * | 6/2013 | Changsrivong | F16B 21/186 403/376 |
| 2013/0330120 | A1 | 12/2013 | Blanchard | |

\* cited by examiner

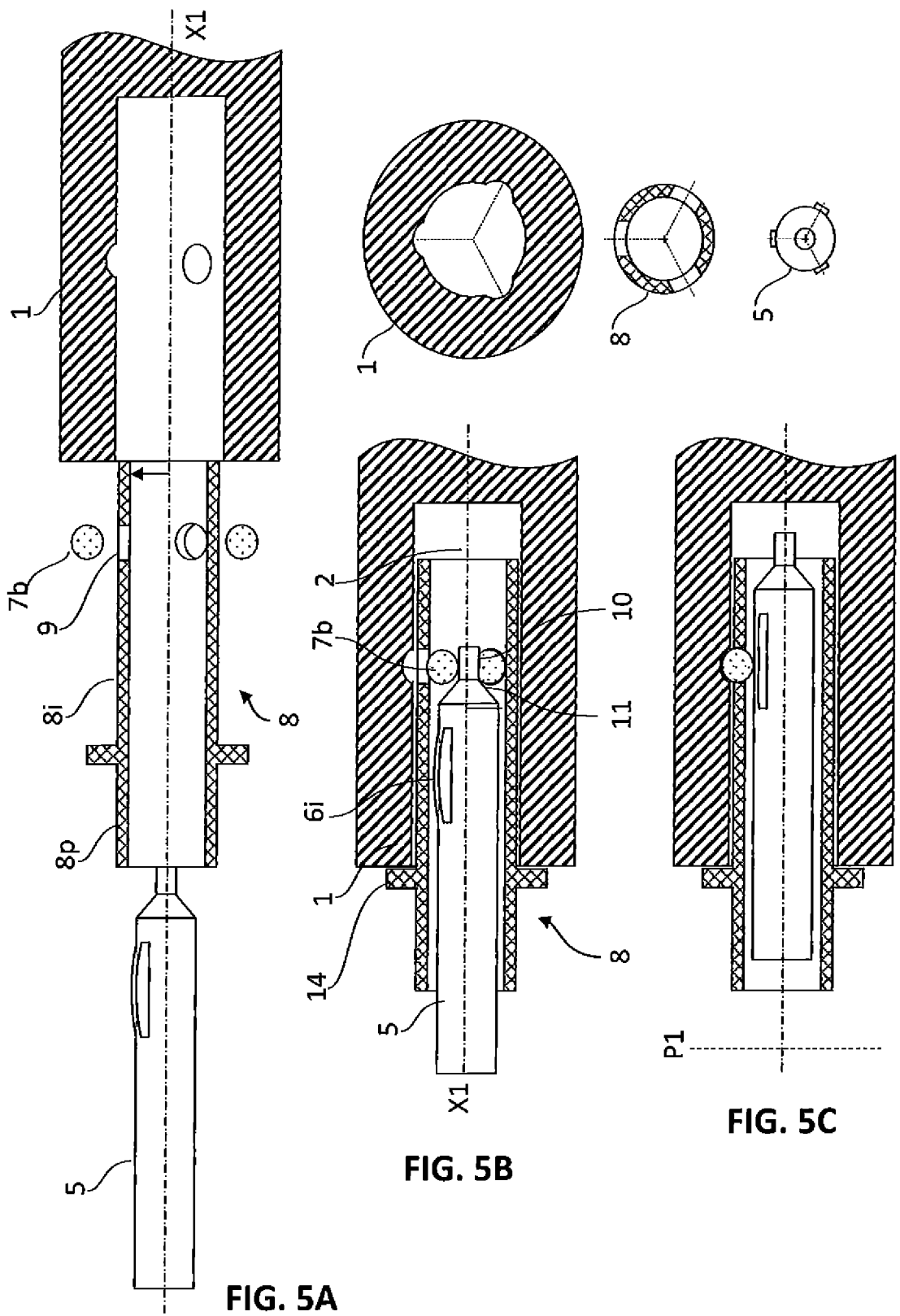

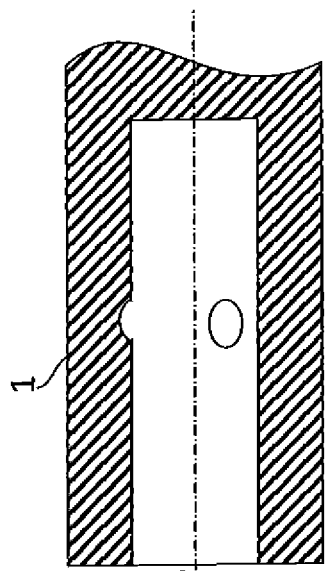
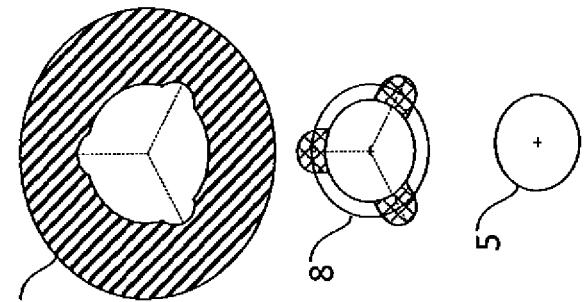
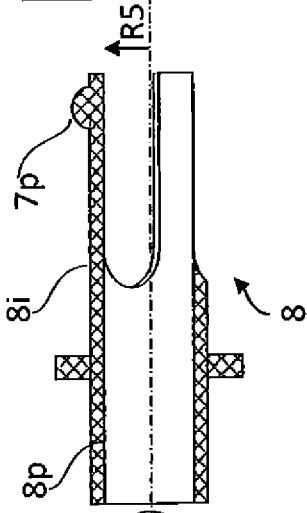
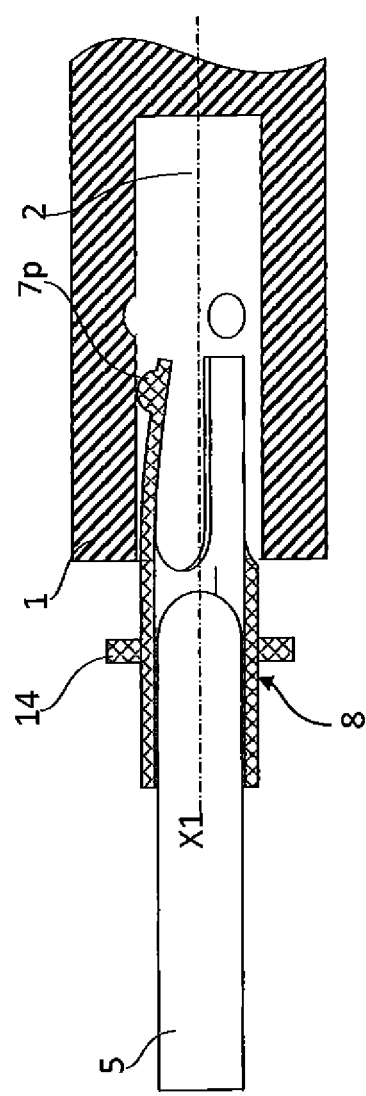
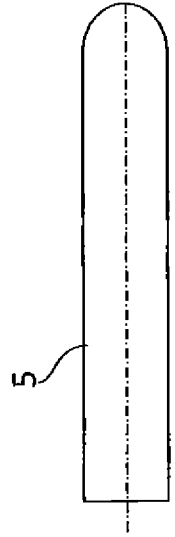
FIG. 8A
FIG. 8B
FIG. 8C

KIT FOR MECHANICALLY COUPLING A ROD TO A CERAMIC ELEMENT

CROSS-REFERENCE TO RELATED APPLICATIONS

This application is a U.S. national stage application, filed under 35 U.S.C. § 371, of International Application No. PCT/EP2018/056698, which was filed on Mar. 16, 2018 and which claims priority to European Application No. EP 17161719.4, filed on Mar. 17, 2017, the contents of which are incorporated by reference into this specification.

BACKGROUND OF THE INVENTION

(1) Field of the Invention

The present invention relates to a kit for mechanically coupling a rod to a ceramic element. A rod is mechanically coupled to a ceramic element if it cannot translate freely along its longitudinal axis with respect to the ceramic element. In specific embodiments, a mechanical coupling also prevents free rotation of the rod about its longitudinal axis with respect to the ceramic element. For example, such embodiments relate to rotating conveyor rolls made of ceramic material used in high temperature applications.

(2) Description of the Related Art

Mechanical coupling between a ceramic element and metallic parts is often required, especially in high temperature applications. In such applications, the ceramic element is usually exposed to higher temperatures than the metallic parts, because of its greater chemical and physical stability at high temperature. Consequently, ceramic elements are less likely to warp in response to a change of temperature. Ceramic materials are also less likely to oxidize or flake off on their surfaces exposed to high temperature.

Ceramic materials are, however, more difficult to shape into complex geometries than metals and because of their brittleness cannot be clamped to other components with too high stresses. In many applications, a ceramic element exposed to high temperature must interact with other components of an assembly, such as with a drive mechanism for translating and/or rotating the ceramic element. A coupling of the ceramic element to a metallic rod is therefore often necessary, said rod allowing for example movement transmission from a drive mechanism to the ceramic element. The rod can be locked to the ceramic element, thus forming a rigid system, in that no movement of translation and/or rotation is possible between the two for all forces applied to the system until breaking of the coupling. Alternatively, the coupling can form a resilient system, in that the metal rod disengages from the ceramic element when the force applied to the system reaches a threshold value, and preferably locks again when the force is reduced. A resilient system protects the ceramic element from fracture.

Mechanically coupling a metal rod to a ceramic element is not straightforward. On the one hand, the differences in mechanical properties between metals and ceramic materials can lead to unbearable stress concentrations leading to crack formation and fracture of the ceramic element. On the other hand, ceramic materials have a relatively low coefficient of thermal expansion (CTE) compared with the CTE of metals. This is an important issue for applications at high temperatures, wherein the metal rod will expand more than the ceramic element upon raising the temperature from room temperature to service temperature or for applications exposed to temperature variations.

Document U.S. Pat. No. 5,695,675 discloses a stopper made of a refractory material for controlling the flow of metal melt out of a tundish in a metallurgic installation. The stopper is connected to a lifting device through an elongated metal rod, for vertically lifting and lowering the stopper. In the arrangement disclosed, the stopper is mechanically coupled in lifting translation with the metal rod by means of a blocking element stabilized against a wall of a cavity in the stopper rod and in the lowering direction by means of a nut screwed on a threaded portion of the metal rod, and tightly resting against an upper end of the stopper.

An example of application requiring rotational torque transmission from a metal rod to a ceramic element can be found in conveying installations for conveying articles through an oven for, e.g., the annealing or tempering of glass or the thermal treatment of sheets made of metal or glass. A conveyor assembly is used for transporting the articles, which comprises rotating ceramic rollers, at least some of them being motorized. Such roller assembly generally comprises a number of ceramic rollers, e.g. made of fused silica, rotatingly mounted on brackets by means of a metal spindle mechanically coupled at each of the rollers ends. The spindles are rotated by a transmission mechanism forming part of the conveyor, e.g. by means of chains or gears, and the rotational movement is transmitted to the ceramic rollers by means of the mechanical coupling between the two. The ceramic rollers of prior art conveying installations are typically provided with a through channel extending along the longitudinal axis of the rollers from one end to the other. A metal shaft is introduced into and mechanically coupled to the through channel and the system is mounted on brackets. The metal shaft is coupled in rotation to a driving mechanism, and the rotation torque of the metal shaft is transmitted to the ceramic roller, thus driving the rotation of the ceramic rollers. The machining of a through channel along the whole length of a ceramic roller is, however, a delicate process and above all it renders the ceramic roller more vulnerable to breakages. The metal shaft introduced in the through channel of the ceramic roller is exposed to similar temperatures as the ceramic element, which limits the applications where such system can be implemented, and/or requires the use of specific, and expensive, high-grade metals.

Document EP 1 693 635 discloses a conveyor roll comprising a ceramic spool coupled to a metallic cap at one of its ends wherein a tolerance ring is inserted between the ceramic spool and the metallic cap. The mechanical coupling in rotation between the ceramic spool and the metallic cap is consequently based on friction forces only, between the ceramic spool, the tolerance ring and the metallic cap. If exposed to high temperature gradients, however, the metallic cap and tolerance ring (also made of metal) expands more than the ceramic spool ends, leading to a loosening of the coupling.

US2013/0330120 discloses a locking mechanism between a metal housing and a hollow structure using a rod inside the hollow structure, pushing radially projecting members ensuring consequently the fixation of the hollow structure to the housing. The rod is radially rigid while the disconnection is ensured thanks to an axially urging member. These fasteners are part of agricultural equipment which are used at room temperature. This kind of mechanism is not adapted for use at high temperature, the urging member such a spring or made of a rubber material would not resist at high temperature. In addition, when a ceramic material is assembled inside a metal element, additional care must be taken to take into consideration the huge difference in thermal expansion coefficients between the metal and the ceramic material and the poor tensile strength of the ceramic.

U.S. Pat. No. 5,141,355 discloses another locking and release mechanism between a cooperating bar and a collar. A gripping force can be tuned using a radial resilient coupling. The rod is radially rigid and the targeted applications take place at room temperature.

It is an object of the present invention to provide an arrangement for the mechanical coupling between a ceramic element and a metal rod. The mechanical coupling must be at least in translation, and may be in rotation, forming a rigid system wherein the metal rod is locked to the ceramic element, or a resilient system, wherein reversible disengagement of the metal rod happens when the force applied to the system exceeds a threshold value. The mechanical coupling is easy to install and is effective in a wide range of application temperatures, and does not require a through channel in the ceramic element, but can be applied to ceramic elements provided with blind holes.

BRIEF SUMMARY OF THE INVENTION

The present invention is defined in the appended independent claims. Specific embodiments are defined in the dependent claims. In particular, the invention concerns a kit of parts for mechanically coupling a ceramic element to a rod comprising an outer surface made of metal, wherein:
(a) the ceramic element comprises a cylindrical ceramic bore defined by a cylindrical bore wall and extending along a longitudinal axis, X1, wherein the cylindrical bore wall comprises at least one recess,
and wherein the rod comprises:
(b) an outer tube comprising a jutting portion adjacent to an insert portion, and further comprising:
an outer tube wall made of metal and defining the outer surface of the rod, wherein a portion of the outer tube wall of the insert portion is cylindrical, extending along a tube axis from a proximal end of the jutting portion to a distal end of the insert portion, and having a radius, R8, mating the cylindrical ceramic bore,
an outer tube bore, preferably comprising a cylindrical portion of radius, R8b, said outer tube bore extending along the tube axis from the proximal end and over a whole length of the jutting portion and further extending over at least part of a length of the insert portion,
(c) at least one projecting member comprising a projecting portion having a geometry insertable into the at least one recess of the ceramic element,
(d) An inner mandrel extending along an axis and having radial dimensions suitable for being inserted into the outer tube bore, and preferably comprising a cylindrical portion of radius, R5≤R8b, wherein
(e) The insert portion of the outer tube can be inserted into the ceramic bore with the projecting portion of the at least one projecting member engaged in the at least one recess, and with the jutting portion jutting out of the ceramic element, and wherein
(f) The inner mandrel can be inserted into the outer tube bore from the proximal end of the outer tube, such that the projecting portion of the at least one projecting member is resiliently stabilized in the at least one recess by a stabilizing portion of said inner mandrel, and the rod is thus mechanically coupled to the ceramic element in that the outer tube cannot translate along the longitudinal axis, b, with respect to the ceramic bore, wherein the stabilizing portion of said inner mandrel is radially resilient, such that the at least one projecting member can be dislodged from the at least one recess upon application onto the outer tube of a force greater than a predetermined threshold force required for decoupling the metal rod from the ceramic element.

Such resiliency of the inner mandrel is of particular interest in applications wherein a rotation torque can be transmitted between the metal rod and the ceramic element and wherein such transmitted torque cannot exceed a given threshold value lest the ceramic element would break. In an advantageous embodiment, the stabilizing portion of said inner mandrel can have a geometry defining a resiliently deformable structure. The stabilizing portion of said inner mandrel can alternatively or additionally comprise a resiliently deformable material.

In an advantageous embodiment, the geometries of the at least one projecting member and of the at least one recess are such that, when said projecting member is engaged and stabilized in the at least one recess, the rod is mechanically coupled to the ceramic element such that the outer tube cannot rotate about the longitudinal axis, X1, with respect to the ceramic bore. In this configuration, a rotation torque can be transmitted from the metal rod to the ceramic element by rotating the outer tube.

In an advantageous embodiment, the rod comprises three or more projecting members, the cylindrical ceramic bore wall comprises three or more recesses, and the projections of the three or more recesses onto a transverse plane P1, normal to the longitudinal axis, X1, are evenly distributed over a circumference of a projection of said cylindrical ceramic bore onto the transverse plane P1. In this configuration, the metal rod can be self-centered in the cylindrical ceramic bore, such that the ceramic element and the metal rod are aligned on the same longitudinal axis, X1, when mechanically coupled. The three or more recesses can be located in a same transverse plane, normal to the longitudinal axis, X1, or can be offset in the direction of the longitudinal axis.

In an advantageous embodiment,
the at least one projecting member comprises a substantially spherical ball having a ball diameter, D, and
the insert portion of the outer tube comprises at least one circular through hole having a diameter larger than the ball diameter, D.
In this embodiment, the inner mandrel can comprise
a cylindrical proximal portion (5p) having a radius, R5, and including the stabilizing portion,
a cylindrical distal portion having a radius, R5d<R5, and
a frusto-conical intermediate portion sandwiched between the cylindrical proximal and distal portions, and
wherein the ball diameter, D, is such that R8b<(D+R5d)<(R8+δ)=R2, wherein δ is the tolerance between the outer tube and the cylindrical ceramic wall, δ=(R2−R8).

In this embodiment, the stabilizing portion of the inner mandrel can comprise at least one longitudinal strip, which is resiliently deformable and which is coupled to the inner mandrel at a first and/or a second ends of the at least one longitudinal strip. A central portion of the at least one longitudinal strip may define a radius, R5s, wherein at rest, R5s≥R5, such that D≥(R24 R5s), wherein R24 is the distance between the longitudinal axis X1 and the bottom of the at least one recess, and wherein when exposed to a flexural stress, the longitudinal strip can bend, such as to reduce the radius R5s<R5, preferably at least to a value of R5s≤(R24−D).

In an alternative embodiment, the at least one projecting member consists of a protrusion extending radially over a height, Dp, from a tip to a base rigidly coupled to a resiliently flexible longitudinal strip forming a portion of the outer tube wall of the insert portion of the outer tube. (Dp+R8) may be comprised between 90 and 105% of R24, wherein R24 is the distance between the longitudinal axis X1 and a closed end of the at least one recess.

In yet an alternative embodiment, the kit of parts according to the invention is such that it further comprises an intermediate tube comprising a proximal portion, a distal portion, an intermediate tube wall, and an intermediate tube bore, wherein the distal portion of the intermediate tube can be inserted into the outer tube bore from the proximal end of the outer tube, the at least one projecting member consists of a protrusion extending radially over a height, Dp, from a tip to a base rigidly coupled to a resiliently flexible longitudinal strip forming a portion of the intermediate tube wall in the distal portion of the intermediate tube, and wherein (Dp+R8b) may be comprised between 90 and 105% of R24, wherein R24 is the distance between the longitudinal axis X1 and a closed end of the at least one recess.

the insert portion of the outer tube comprises at least one circular through hole having a diameter allowing the engagement therethrough of the at least one protrusion, and once the insert portion of the outer tube is inserted in the ceramic bore, and the intermediate tube is engaged in the outer tube bore with the at least one protrusion engaged in the at least one circular through hole and in the at least one recess, the inner mandrel has a diameter, R5, such that it can be inserted into the intermediate tube bore from the proximal portion of said intermediate tube, to stabilize the at least one protrusion in the at least one recess.

The cylindrical ceramic bore can be a blind hole in said ceramic element or, alternatively, can form a through channel open at both ends.

The ceramic element may comprise fused silica.

In an advantageous embodiment, the ceramic element is a conveyor roller of a conveyor system for conveying products exposed to or being at a high temperature of at least 200° C., at least 500° C.; or at least 800° C., and wherein the insert portion of the outer tube is exposed to a temperature of at least 150° C., at least 200° C., or at least 300° C., and not more than 500° C., or not more than 400° C.

The invention also concerns a conveyor roller assembly for a conveyor system for conveying products exposed to or being at a high temperature of at least 200° C., said conveyor roller comprising:

(a) a cylinder made of ceramic and extending along a longitudinal axis, X1, comprising a first end and a second end, each of the first and second ends being provided with a cylindrical ceramic bore defined by a cylindrical bore wall and extending along the longitudinal axis, X1, wherein the cylindrical bore wall comprises at least one recess, (b) a first and second rods extending along the longitudinal axis and being resiliently coupled to each of the first and second cylindrical ceramic bores, each of the first and second rods comprising:

(c) an outer tube comprising an insert portion inserted in the corresponding cylindrical ceramic bore, which is adjacent to a jutting portion jutting out of the corresponding cylindrical ceramic bore, and further comprising:

an outer tube wall made of metal and defining the outer surface of the rod, wherein a portion of the outer tube wall of the insert portion is cylindrical, having a radius, R8, mating the cylindrical ceramic bore, an outer tube bore comprising a cylindrical portion of radius, R8b, said outer tube bore extending along the longitudinal axis, X1, from the proximal end and over a whole length of the jutting portion and further extending over at least part of a length of the insert portion, (d) At least one projecting member comprising a projecting portion engaged in the at least one recess of the ceramic element, (e) An inner mandrel inserted in the outer tube bore from the proximal end of the outer tube, such that the projecting portion of the at least one projecting member is resiliently stabilized in the at least one recess by a stabilizing portion of said inner mandrel, and the rod is thus mechanically coupled to the ceramic element in that the outer tube cannot translate along the longitudinal axis, X1, with respect to the ceramic bore, wherein the stabilizing portion of said inner mandrel is radially resilient, such that the at least one projecting member can be dislodged from the at least one recess upon application onto the outer tube of a force greater than a predetermined threshold force required for decoupling the metal rod from the ceramic element.

BRIEF DESCRIPTION OF THE SEVERAL VIEWS OF THE DRAWINGS

These and further aspects of the invention will be explained in greater detail by way of example and with reference to the accompanying drawings in which:

FIGS. 4-6 show the embodiment of the kit of parts described in Example 1;

FIG. 8 shows the embodiment of the kit of parts described in Example 3; and

The figures are not drawn to scale.

DETAILED DESCRIPTION OF THE INVENTION

The invention relates to a kit of parts for mechanically coupling a ceramic element 1 to a rod comprising an outer surface made of metal. The ceramic element can be typically a component of an arrangement used in high temperature applications. For example, the ceramic element can be a stopper for controlling the flow of a metal melt from a tundish into a mould; the stopper is partly immersed in metal melt at temperatures above 1400° C. Alternatively, the ceramic element can be a driven conveyor roller of a conveying installation for transporting loads like glass or metal sheets through a furnace for thermal treatment of the sheets. A ceramic element can be made of any known ceramic material suitable for the applications it is designed for. In particular, a ceramic element can be made of fused silica, graphite, alumina, electro fused materials, and the like. Beside high temperature conveyor rollers, ceramic elements can be used in various applications, including structural parts hanging in high temperature applications like a stopper of a tundish in metallurgic installations; glass bending accessories, stirrers and skimmers in high temperature liquids, such as metal or glass melt, and the like.

Figure 1:
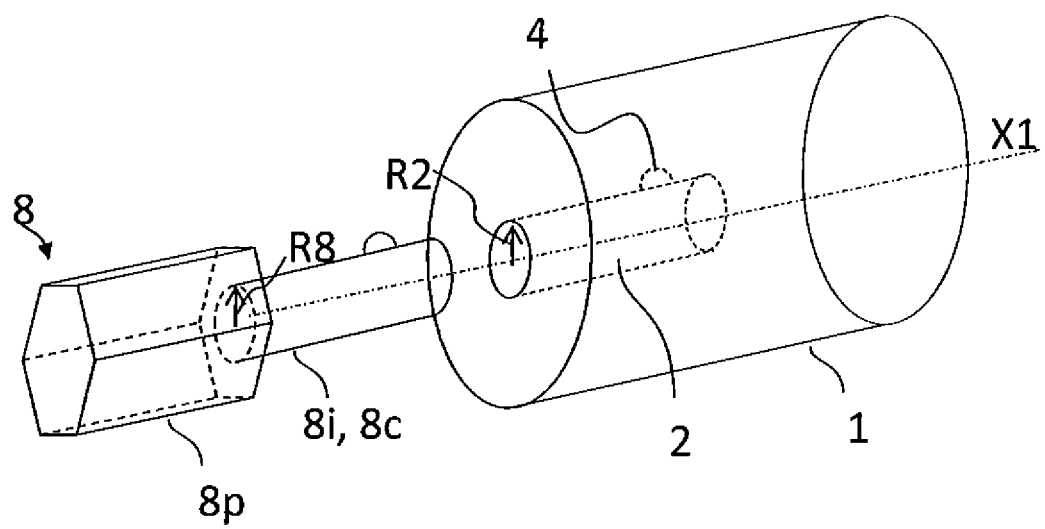
FIG. 1 schematically shows a ceramic element and a metal rod of a kit according to the invention before mechanical coupling.

As illustrated in FIG. 1, the ceramic element 1 comprises at least one ceramic bore 2 comprising a cylindrical portion. For sake of clarity and conciseness, the expression "cylindrical ceramic bore" is to be construed in the following as a "ceramic bore comprising a cylindrical portion". The cylindrical ceramic bore can be a blind hole or a through hole, forming a through channel open at both ends. The cylindrical ceramic bore extends along a longitudinal axis, X1, and is defined by a cylindrical bore wall. In the cylindrical ceramic bore wall, at least one recess 4 is included. Such recess is advantageously a closed end cavity like for example a hollow, an indentation or groove in the ceramic bore wall. In some embodiments, however, the recess can be a through hole extending generally radially with respect to the longitudinal axis, X1.

Figure 2:
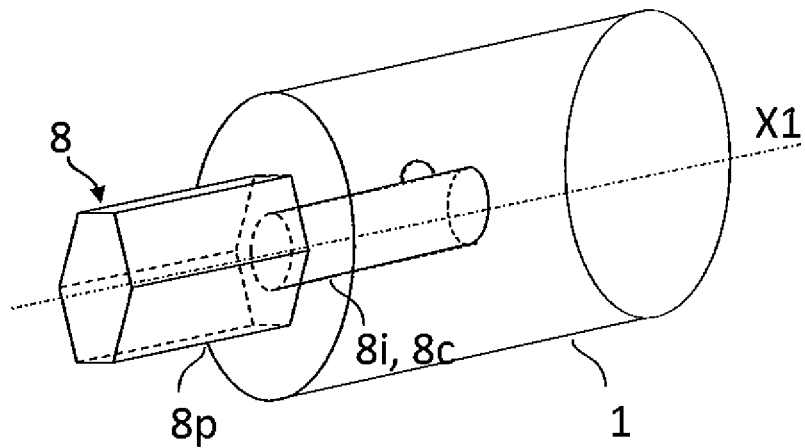
FIG. 2 shows the ceramic element and metal rod of the kit of FIG. 1.

As shown in FIGS. 1&2, a metal rod can be inserted into the cylindrical ceramic bore 2 for mechanically coupling it to the ceramic element. The rod comprises an outer tube 8 having an outer tube wall made of metal. The outer tube comprises an insert portion 8i comprising a cylindrical portion 8c which is suitable for being inserted into the cylindrical ceramic bore, and a jutting portion 8p, suitable for being coupled to an external component, such as a translation and/or rotation driving system.

The insert portion 8i is the portion of the outer tube inserted in the cylindrical ceramic bore 2 when coupling the ceramic element to the metal rod. The insert portion comprises a cylindrical portion 8c with a radius R8 mating the cylindrical ceramic bore of radius, R2. The insert portion can thus be inserted into the cylindrical ceramic bore and the outer tube 8 can be mechanically coupled to the ceramic element 1 by a mechanism explained in detail below, such that the outer tube cannot freely translate along the longitudinal axis, X1, with respect to the ceramic element. For a satisfactory mechanical coupling, the rod should not be allowed to toggle within the cylindrical ceramic bore, at service temperature. Toggling of the rod can be prevented by ensuring that the outer tube has a radius, R8, which is, within a tolerance, δ, substantially equal to (and lower by δ than) the radius, R2, of the cylindrical ceramic bore 2 at the intended service temperature.

Taking account of the differing CTE's of ceramic materials and metals, for high temperature applications of the kit of parts according to the invention, the radius, R8, of the cylindrical portion 8c at room temperature (=20° C.) will typically be substantially smaller than the radius, R2, of the cylindrical ceramic bore 2, by a value of (δ+(ΔR8−ΔR2)), such that the insert portion 8i can be loosely inserted into the cylindrical ceramic bore at room temperature, but snugly fits within a tolerance of δ at elevated service temperature.

$R2(ST)-R8(ST)=\delta \Leftrightarrow (R2(RT)+\Delta R2)-(R8(RT)+\Delta R8)=\delta \Leftrightarrow$ R2 (RT)−R8 (RT)=δ+(ΔR8−ΔR2), with ΔRi=αi Ri(RT) ΔT (i=2 or 4);

ST=service temperature,

RT=room temperature,

A=CTE.

The jutting portion 8p of the outer tube 8 is the portion of the outer tube protruding from the ceramic element 1 when the insert portion 8i is inserted in the ceramic cylindrical bore 2. The jutting portion 8p can be cylindrical but can have any shape suitable for interacting with other components of an assembly, such as a drive mechanism to which the rod is coupled with, for example, a polygonal cross section, as represented in FIGS. 1 and 2.

Figure 3A:
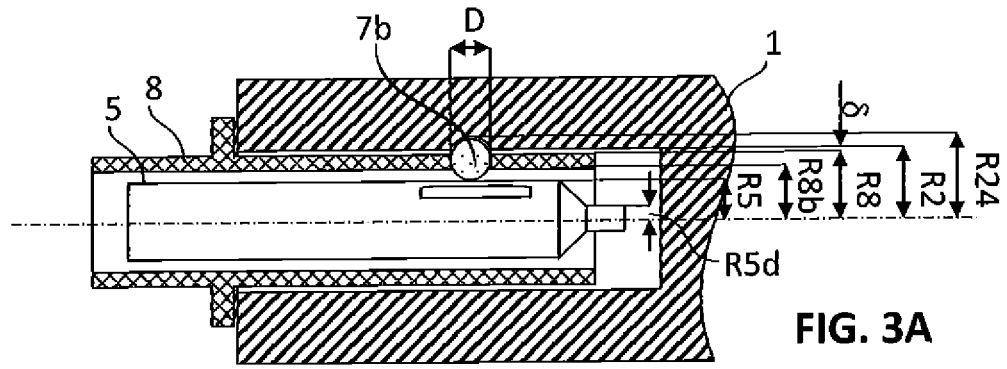
FIG. 3 shows a sectional view including a projecting member nested in a recess of a ceramic element wherein (a) the projecting member is a separate element of the kit according to the invention, and (b)&(c) the projecting member is an integral part of a component of the kit according to the invention.
Figure 3B:
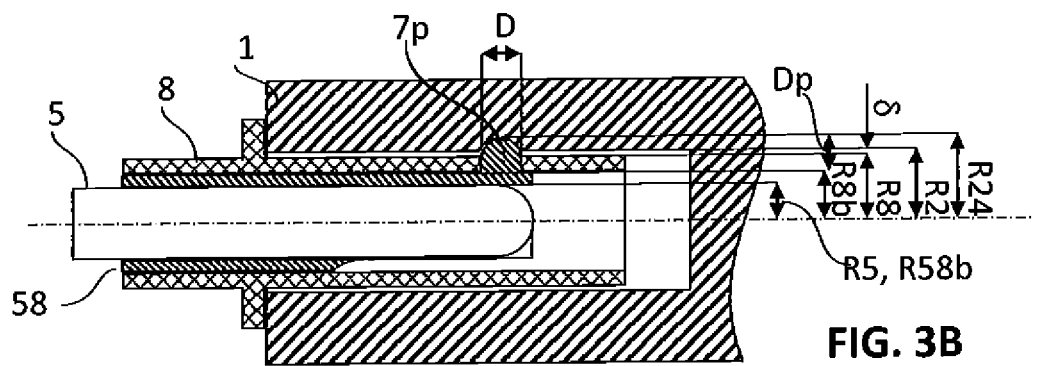
Figure 3C:
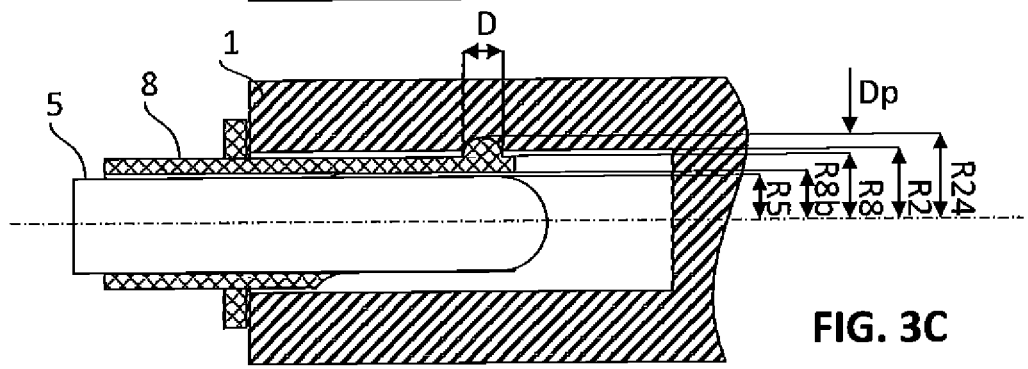

The outer tube 8 is hollow and comprises an outer tube bore comprising a cylindrical portion of radius, R8b, smaller than the radius, R8, of the insert portion 8i and extending over a whole length of the jutting portion 8p and over at least a part of the length of the insert portion 8i, as shown in FIGS. 3(a), 3(b), and 3(c). The outer tube bore is essential to the invention as it serves to accommodate other elements of the rod used to mechanically couple it to the ceramic element.

When the kit of parts according to the invention is assembled, the outer tube 8 of the rod 2 is inserted in the cylindrical ceramic bore, as illustrated in FIG. 2. It must, however, be mechanically coupled to the ceramic element, such that it cannot freely translate along and possibly rotate about the longitudinal axis, X1, with respect to the ceramic element. In order to mechanically couple the outer tube to the ceramic element, the kit of parts according to the invention also comprises at least one projecting member 7 comprising a projecting portion insertable into the at least one recess 4 of the ceramic element. The projecting member can be a separate component 7b of the kit, as illustrated in FIG. 3(a), or it can be an integral part 7p of an element of the kit, such as the outer tube 8 or an intermediate tube 58 described below (cf. FIGS. 3(b), 6, and 7). In any case, once the kit of parts according to the invention is assembled, the at least one projecting member 7b, 7p is engaged into at least one corresponding recess of the cylindrical ceramic bore by various mechanisms described below, and the metal rod is mechanically coupled to the outer tube 8.

Since the at least one projecting members was inserted into a corresponding recess, absent a securing means, it is likely that it can also be withdrawn from the recess, and the outer tube would then not be mechanically coupled to the ceramic element anymore. It is therefore necessary to lock the at least one projecting member in the corresponding recess. This is achieved by inserting an inner mandrel 5 into the outer tube bore. The inner mandrel comprises a cylindrical portion of radius R5, smaller than or substantially equal to the radius, R8b, of the outer tube bore (R5≤R8b). The entirety or a portion of the inner mandrel can be made of metal or of other materials like for example elastomeric materials, depending on the intended service temperature at which the rod is to be exposed when in use. A rigid or, according to a specific embodiment of the invention, a resilient locking of the projecting member in the corresponding recess can be achieved by selecting the geometry and/or materials of the inner mandrel.

In one embodiment, the insert portion 8i of the outer tube comprises through holes 9 allowing each of the at least one or more projecting members 7b, 7p, to move radially outwards to engage into the corresponding one or more recesses 4 of the cylindrical ceramic bore 2, and thus mechanically couple the outer tube to the ceramic element. The projecting members 7b, 7p may be made of metal, but they can be made of a ceramic material or, depending on the intended service temperature, in a polymeric material, and even in a resilient material such as an elastomer.

Figure 6:
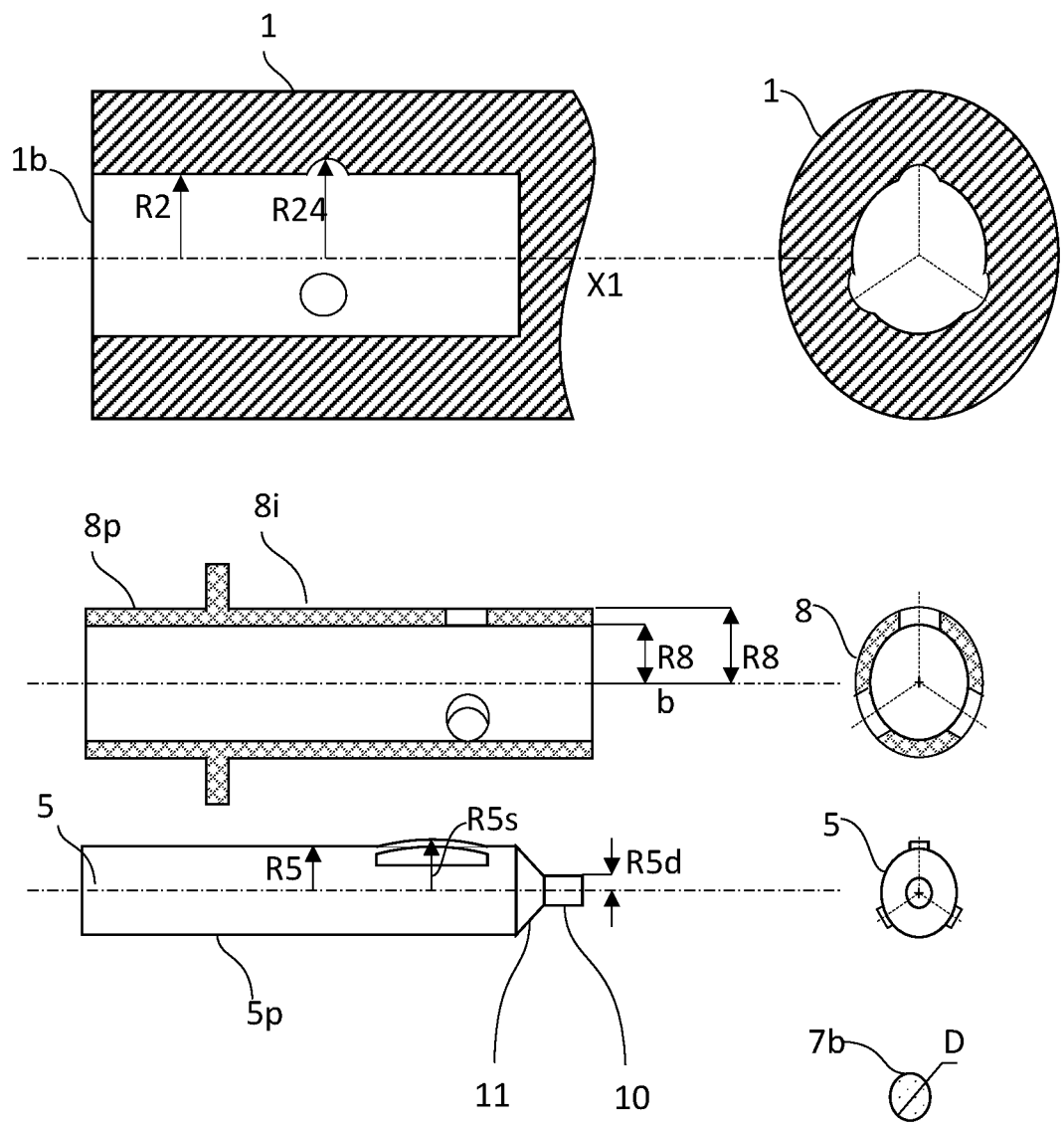

In this embodiment, the projecting member 7b can be a separate component of the kit. For example, as represented in FIGS. 3(a), 5, and 6, the projecting member 7b can be in the shape of a ball of diameter, D, which can be nested in the outer tube bore as the outer tube is being inserted into the cylindrical ceramic bore and, once the through hole 9 faces a corresponding recess 4, the ball can be pushed out radially through the corresponding through hole 9 and into the recess, while still crossing the through hole 9 and rests on the outer surface of the mandrel, specifically on a stabilizing portion 5s of the mandrel.

Alternatively, as illustrated in FIG. 7, the projecting member can be formed by a protrusion 7p extending radially over a height, Dp, from a tip to a base rigidly coupled to a resiliently flexible longitudinal strip forming a portion of an intermediate tube 58. The height Dp is such that (Dp+R8b) may be comprised between 90 and 105% of R24, wherein R24 is the distance between the longitudinal axis X1 and a closed end of the at least one recess 4. Each projecting member 7p comprises a projecting portion, which may have a geometry of spherical cap of diameter, D.

The dimensions of the through hole 9 in the outer tube wall must be sufficiently large to allow the projecting portion of the projecting member 7b, 7p to be inserted into the recess 4 through the through-hole 9, and sufficiently small such that once engaged in the corresponding recess, a projecting member contacts the though-hole wall over substantially the whole perimeter of the through-hole. This way, the outer tube is mechanically coupled to the ceramic element in the longitudinal direction X1, without toggling. As such, the projecting portion of the at least one projecting member 7b, 7p, the at least one recess 4 and the at least one through hole 9 have advantageously substantially the same spatial extent along the longitudinal axis X1. This way no relative axial motion along the longitudinal axis X1 between the ceramic element 1, the projecting member 7 and the outer tube 8 can occur.

In an alternative embodiment illustrated in FIGS. 3(b) and 8, the outer tube does not comprise any through-hole. Instead, the projecting member 7p is an integral part of the outer tube. The projecting portion of the projecting member is advantageously protruding from the outer tube wall such that it can be inserted into the recess 4 when the cylindrical portion 8c of the outer tube 8 is inserted in the ceramic bore 2. Also in this case, for the reasons exposed in the previous section, the projecting portion of the at least one projecting member 7p and the at least one recess 4 have advantageously substantially the same spatial extent along the longitudinal axis X1. The height of the projecting member is lower than in the embodiment illustrated in FIG. 7, and is substantially equal to the depth, (R24−R2), of the recess 4.

During the assembly of the kit of parts according the invention, the inner mandrel 5 is thus to be inserted into the outer tube bore, either directly or, if an intermediate tube is already inserted in the outer tube bore, into an intermediate tube bore, from the proximal end of the outer tube 8 or intermediate tube 58. The inner mandrel is used to stabilize the projecting portion of the at least one projecting member 7b, 7p in the at least one recess 4 by means of a stabilizing portion 5s of said inner mandrel. The stabilizing portion 5s of said mandrel 5 needs consequently to have a geometry and dimensions such that once inserted in the cylindrical portion 8c of the outer tube bore or of the intermediate tube 58, the projecting member 7b, 7p is sandwiched between said stabilizing portion and the wall of the recess 4.

When the projecting member 7b is a separate component of the kit and when the outer tube 8 comprises a through hole 9 to accommodate such a projecting member 7b, the projecting member 7b can have a shape and dimensions such that when it is secured in the recess 4 it is protruding inside the outer tube bore. In this case, the stabilizing portion 5s of the mandrel has consequently a radius R5s substantially smaller than the outer tube bore radius, but large enough to radially snugly stabilize the projecting member in the through hole 9 and recess 4, at the intended service temperature.

When the projecting member 7p is an integral part of the outer tube 8 or of the intermediate tube 58 (cf. FIGS. 7&8) and is protruding from the outer tube wall or intermediate tube wall, the stabilizing portion of the inner mandrel 5 is advantageously cylindrical and has a radius R5. If the projecting member 7p is an integral part of the outer tube 8, R5 can be substantially equal to the radius R8b of the cylindrical portion 8c of the outer tube bore at the intended service temperature. Similarly, If the projecting member 7p is an integral part of the intermediate tube 58, R5 can be substantially equal to the radius R58b of the intermediate tube bore at the intended service temperature. In case of a resilient locking of the projecting member in the corresponding recess, the stabilizing portion 5s has a resilient structure and/or comprises a resilient material and can have a radius R5s>R5, such that when the projecting member is engaged in the recess and contacts the back wall thereof, the 5s is in radial compression and pressed down radially until reaching a radius R5, at the intended service temperature.

When the inner mandrel 5 is inserted in the outer tube bore or intermediate tube bore, the projecting portion of the at least one projecting member 7b, 7p is stabilized in the at least one recess 4 by the stabilizing portion of the inner mandrel 5, and the metal rod is thus mechanically coupled to the ceramic element 1 in that the outer tube cannot translate along the longitudinal axis, X1, with respect to the ceramic bore 2. It is important to note that when the projecting portion of the at least one projecting member 7b, 7p is inserted in the at least one recess 4, the mechanical coupling in translation is achieved for both directions along the longitudinal axis, X1. Consequently, the metal rod cannot translate in, or slide in or out of the ceramic bore 2 along the longitudinal axis X1.

The coupling may be resilient, and the stabilizing portion 5s of the mandrel can have a resilient structure and/or comprise resilient materials. Resilience is the ability of a (visco)elastic material to absorb energy when it is deformed and to release at least part of said energy when it is unloaded. Resilience is observed in elastic materials upon application of a stress lower than the yield stress above which the material is deformed plastically or lower than the fracture stress above which the material breaks. The behavior of viscoelastic materials depends on the temperature and on the strain rate. If a viscoelastic material is deformed at a higher rate and/or lower temperature, it behaves more like an elastic material as discussed supra. If it is deformed at a lower rate and/or a higher temperature, it behaves more like a viscous material. The higher the viscous component of the deformation, the lower the rate at which the material is able to release the energy absorbed during deformation and to return to its initial configuration.

In continuation, the terms "force", "stress", and "torque" may be used according to the context. All these terms are related to a "force". A torque, $\tau$, is a rotational force and its magnitude is the product of the force vector, F, and the distance vector, r, separating the point of force application from the rotating point or axis ($\tau$[Nm]=F×r). A stress, $\sigma$, is calculated as the force, F, divided by the area, A, on which the force is applied ($\sigma$[Pa]=F/A). Whenever the terms "torque" or "stress" are used, they can easily refer to a "force" and their use is restricted to specific embodiments where their use is considered more accurate than the use of the term force.

When a stress is applied to the outer tube 8, said stress is transmitted to the ceramic element by the at least one projecting member engaged in the at least one recess of the ceramic element bore. The projecting member is forced out of the recess by the transmission thereto of the stress applied to the outer tube 8 but is retained by the stabilizing portion 5s of the inner mandrel 5. A threshold force or stress at which the outer tube 8 decouples from the ceramic element can be predefined by designing the stabilizing portion 5s of the inner mandrel to be sufficiently deformed upon application of a stress equal to the desired threshold stress for dislodging the at least one projecting member from the at least one recess and thus decoupling the outer tube 8 from the ceramic element. It is preferred that the threshold stress be selected as being lower than the fracture resistance of the ceramic element above which the ceramic element breaks. This way, if a stress higher than the fracture resistance of the ceramic element is applied to the outer tube, the latter gets decoupled from the ceramic element by the deformation of the stabilizing portion dislodging the at least one projecting member, thus preventing the ceramic element from breaking. The stabilizing portion 5s is then considered to be resilient. By contrast, if the threshold force is higher than the breaking resistance of the ceramic element, the stabilizing portion 5s is considered to be rigid, since the outer tube will not decouple from the ceramic element, and the ceramic material will break. In the present invention, it is advantageous that the stabilizing portion be resilient.

In a particular embodiment, the threshold stress is lower than the yield stress or fracture stress of the resilient stabilizing portion. 5s This way, when the stress applied to the outer tube 8 is lowered below the threshold stress, the resilient stabilizing portion returns to or close to its initial shape, thus engaging the at least one projecting member into the at least one recess. This is highly advantageous in applications wherein the outer tube transmits a rotational torque to the ceramic element. In case of a peak of the torque above the threshold stress, the outer tube is decoupled from the ceramic element, thus preventing the ceramic element from breaking. As soon as the torque is reduced below the threshold stress, the outer tube is automatically coupled to the ceramic element again and can resume transmitting a rotational torque to the ceramic element. This is particularly advantageous in applications wherein the ceramic element is a cylindrical conveying element.

If the threshold stress is higher than the yield stress or fracture stress of the stabilizing portion 5s, the ceramic element is protected from breaking in case of a peak of stress higher than the fracture resistance of the ceramic element, but since the stabilizing portion 5s is permanently deformed or broken, it is unable to restore the coupling between the outer tube and the ceramic element once the stress has lowered below the threshold stress. In this case, the inner mandrel acts like a sacrificial fuse which breaks instead of the ceramic element. A new inner mandrel must replace the permanently deformed or broken inner mandrel to restore the coupling of the outer tube to the ceramic element.

In one example of the invention, the cylindrical bore wall 2 of the ceramic element 1 can comprise an annular recess, forming a circumferential groove in said cylindrical bore wall. In this configuration, a mechanical coupling in translation between the ceramic element 1 and the metal rod is obtained along the longitudinal axis X1. With an annular recess 4, and ignoring any frictional forces, the metal rod is, however, free to rotate about its longitudinal axis, X1. A mechanical coupling in translation is thus obtained between the metal rod and the ceramic element, but no significant rotational torque can be transmitted from the metal rod to the ceramic element.

If, besides a mechanical coupling in translation, a mechanical coupling in rotation is also desired, the cylindrical bore wall of the ceramic element 1 can comprise at least one recess 4 having a limited dimension in a circumferential direction with respect to the longitudinal axis, X1, and the projecting portion of the projecting member 7b, 7p inserted in such recess 4 has substantially the same dimension as the recess in a circumferential direction with respect to the longitudinal axis, X1. In the case illustrated in FIGS. 3(a), 5, 6, and 8 wherein the projecting member 7b, 7p is engaged in a recess through a through hole 9, the through hole 9 has then advantageously a dimension in a circumferential direction with respect to the longitudinal axis, X1, which allows the projecting member to contact the through hole wall over substantially the whole of the perimeter of the through hole. In this configuration, once the projecting portion is stabilized into the recess by means of the stabilizing portion 5s of the mandrel 5, the metal rod is mechanically coupled both in translation and in rotation to the ceramic element 1 in that the outer tube 8 can neither slide along, nor rotate about the longitudinal axis, X1, with respect to the ceramic element. A rotation torque can consequently be transmitted from the metal rod to the ceramic element by rotating the outer tube.

In an example of the invention, the cylindrical ceramic bore wall comprises three or more recesses 4, and the projections of the three or more recesses onto a transverse plane P1, normal to the longitudinal axis, X1, are evenly distributed over a circumference of a projection of said cylindrical ceramic bore onto the transverse plane P1. This configuration is of particular interest because with at least three recesses 4 evenly distributed about the longitudinal axis, X1, the metal rod can be self-centered in the cylindrical ceramic bore, such that the ceramic element 1 and the metal rod are aligned on the same longitudinal axis, X1, when mechanically coupled. This is particularly important for mechanical coupling in rotation of a metal rod to a ceramic element, wherein the longitudinal axis, X1, of the metal rod must be coaxial with the desired axis of rotation of the ceramic element.

The three or more recesses 4 can belong to a same transverse plane of the cylindrical bore wall 2, normal to the longitudinal axis, X1. In another configuration, the three or more recesses can be distributed with an axial offset with respect to the longitudinal axis, X1. This can be advantageous for thin ceramic structures, as three or more recesses aligned over a same circumference of the cylindrical ceramic bore could possibly weaken the mechanical properties of the ceramic element.

In an embodiment falling out of the invention, the stabilizing portion 5s of the inner mandrel 5 can be radially rigid. A rigid stabilizing portion is characterized herein as having a compression or flexural modulus of at least 0.1 GPa at the intended service temperature. In such example of the invention, the projecting portion of the at least one projecting member is rigidly stabilized in the at least one recess. As such, it is not possible to dislodge the projecting portion of the projecting element 7b, 7p from the recess 4 upon application of a translational or rotational stress between the outer tube 8 and the ceramic element 1, without breaking the mechanical coupling.

In an alternative embodiment of the invention, the stabilizing portion 5s of the inner mandrel 5 is radially resilient such that the projecting portion of the projecting member 7b, 7p can press down onto the resilient portion and thus be dislodged from the recess 4 upon application onto the outer tube 8 of a force greater than a predetermined threshold force. This is of particular interest in applications wherein a rotation torque can be transmitted between the metal rod and the ceramic element 1 and wherein such transmitted torque cannot exceed a given threshold lest the ceramic element would break. For example, the ceramic element 1 can be a series of conveyor rollers of a conveying system, which rotation driven by a motor, allows the conveying of a load. In case of a heavier than allowed load, or if a good is blocked and unable to move under the rotation of the roller, such obstruction can create unwanted friction between the goods and the conveyor, which could break some rollers. The dislodgment of the projecting portion of the projecting member from the recess by means of the projecting members pressing down radially onto the radially resilient stabilizing portion 5s of the mandrel when a given threshold in the torque magnitude is reached, permits the metal rod to rotate with respect to the ceramic element without damaging any component. When the obstruction is removed, the projecting member eventually face a recess again, and can engage it to establish a mechanical coupling in rotation anew. The predetermined threshold of the rotation torque triggering the decoupling of the metal rod from the ceramic element can be tuned by varying the level of resiliency (stiffness) of the stabilizing portion of the mandrel.

Figure 4A:
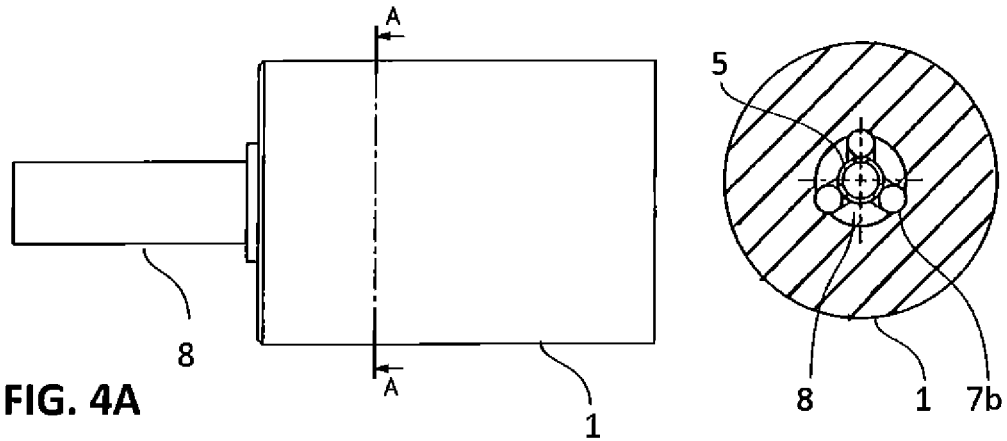
Figure 4B:
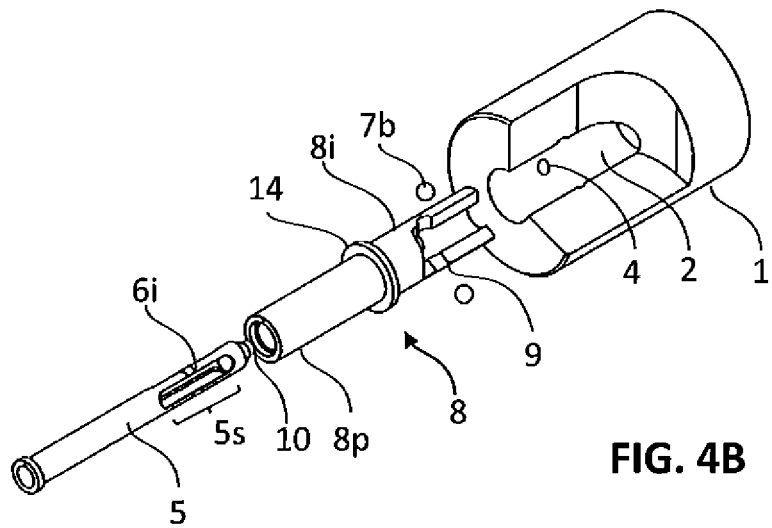
Figure 4C:
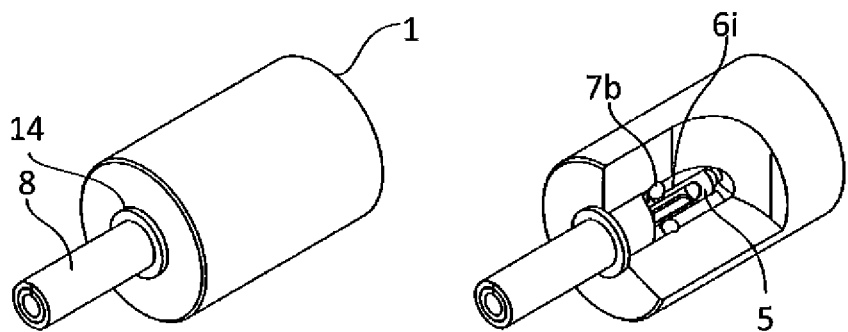

In an example of the invention, the inner mandrel 5 can comprise a radially resilient stabilizing portion having a geometry defining a resiliently deformable structure. As illustrated in FIGS. 4 to 6, such geometry can for example be defined by at least one longitudinal strip 6i which is resiliently deformable and which is coupled to the inner mandrel at a first and second ends of the at least longitudinal strip. In such configuration, the value of the threshold force or torque can be tuned by choosing a material with the appropriate flexural stiffness and/or by varying the thickness of the strip. The flexural modulus of the strips can be of the order of not more than 0.1 GPa, or not more than 0.01 GPa. As shown in FIGS. 4 to 6, a hollow is provided below and possibly on the sides of the longitudinal strip to afford room for the resilient deformation of the longitudinal strip, when the threshold value of the rotational torque is reached.

In an alternative embodiment, the stabilizing portion 5s of the mandrel 5 can be in the form of a hollow tube, with mandrel walls dimensions such as to be resiliently deformable such as to dislodge the projecting members from the corresponding recesses upon application of a force higher than the threshold force.

In other examples of the invention, the inner mandrel 5 can be a full cylinder comprising a stabilizing portion made of a resilient material, for example an elastomeric material, at the intended service temperature. By resilient material, it is meant a material having a compression modulus of not more than 0.1 GPa, or not more than 0.01 GPa. In such configuration, the value of the threshold force or torque can be tuned by choosing a material with the appropriate resiliency and/or the thickness of said material, which can surround a cylindrical core made of a rigid material.

EXAMPLES OF REALIZATION

Example 1

In FIGS. 4 to 6, an embodiment of a kit of parts for mechanically coupling a ceramic element 1 to a metal rod according to the invention is represented. In this kit, the cylindrical bore wall comprises three recesses 4 located in a same transverse plane normal to the longitudinal axis, X1, the three recesses being evenly distributed over a circumference of said cylindrical ceramic bore. The projecting members 7b comprise three substantially spherical balls having a ball diameter, D, which can be engaged into the recesses 4 of the ceramic element through three corresponding through holes 9 provided in the cylindrical portion 8c of the outer tube wall. The three through holes 9 have a diameter larger than the ball diameter, D. The three balls can thus be lodged within the outer tube bore as the outer tube is being inserted into the cylindrical ceramic bore, and can be engaged into the corresponding recesses through the through holes when the through-holes face the corresponding recesses. In this example of the invention where the projecting members are balls 7b, the recesses 4 are advantageously substantially spherical and have a radius of curvature smaller than, or substantially equal to, the radius, D/2, of the spherical balls 7b. In a particular embodiment, the recesses and the substantially spherical balls have the same radius of curvature.

As shown in FIGS. 5 and 6, the inner mandrel 5 has a specific geometry comprising three distinct portions:
 a cylindrical proximal portion 5p having a radius, R5, and including the stabilizing portion,
 a cylindrical distal portion 10 having a radius, R5d<R5, and
 a frusto-conical intermediate portion 11 sandwiched between the cylindrical proximal and distal portions.

The ball diameter, D, is such that R8b (D+R5d) (R8+δ) =R2, with R8b being the radius of the outer tube bore, R8 the external radius of the insert portion 8i of the outer tube, R2 the radius of the cylindrical ceramic bore, and δ the tolerance between the outer tube and the cylindrical ceramic wall, δ=(R2−R8). The ball may be made of metal, but it can be made of a ceramic material or, depending on the intended service temperature, in a polymeric material, and even a resilient material such as an elastomer.

In this embodiment of the invention, the coupling of the metal rod to the ceramic element 1 proceeds as follows. The inner mandrel 5 is first introduced into the outer tube bore up to a depth where the cylindrical distal portion 10 having radius R5d faces the through holes 9 of said outer tube 8. The balls 7b can be introduced through the through holes 9 to rest on the cylindrical distal portion 10. The balls must not jut out of the outer tube wall through the corresponding through holes 9 by more than the tolerance, δ=(R2−R8) so that the assembly composed of the outer tube, inner mandrel and balls can be inserted into the cylindrical ceramic bore. Consequently, the ball diameter, D≤(R2−R5d). On the other hand, the ball shall not roll freely away from the distal portion 10 of the inner mandrel, as the inner mandrel is in the outer tube bore. For this reason, the ball diameter, D≥(R8b−R5d). Consequently, the balls having a diameter D defined as, (R8b−R5d) D≤(R2−R5d), are axially blocked in a position resting on the distal portion 10 of the inner mandrel and nested in corresponding through holes 9. The balls can be momentarily secured radially in this position nested in the through holes 9 for the time required for inserting the outer tube into the cylindrical ceramic bore 2 by using a magnet, by coating them with a grease which adheres to the surfaces in contact, or by using an adhesive strip wrapped around the outer tube at the level of the through holes.

The insert portion of the outer tube 8, with the inner mandrel engaged in the outer tube bore with balls 7b resting on the distal portion 10 of the inner mandrel and nested in each corresponding through hole 9, can be inserted into the cylindrical ceramic bore until the through-holes face corresponding recesses 4. A flange 14 is advantageously provided between the insert portion 8i and the jutting portion 8p of the outer tube. Such flange consequently abuts against the ceramic element when the through holes in the outer tube face the recesses in the ceramic bore. The angular orientation of the outer tube with respect to the positions of the recesses can be indicated by appropriate markings on both outer tube (e.g., on the flange) and on the ceramic element.

At this stage, the inner mandrel can be pushed deeper into the outer tube bore. Because of their diameter, D, as discussed supra, the balls cannot move away from the through holes as the inner mandrel is pushed forward. Consequently, the balls roll along the surface of the distal portion of the inner mandrel until they reach the frusto-conical intermediate portion 11, whence they are moved radially outwards as they roll up the slope formed by said frusto-conical intermediate portion 11, until they reach the cylindrical proximal portion 5p of the inner mandrel, and stop at the stabilizing portion 5s. As discussed above the stabilizing portion 5s has a radius, R5s≥R5, wherein R5 is the radius of the cylindrical proximal portion of the inner mandrel. If the stabilizing portion of the inner mandrel is rigid, then R5s=R5, or is only slightly higher, by a tolerance range, δ, measured at the intended service temperature. If the stabilizing portion is resilient, then R5s can be larger than R5, provided the stabilizing portion can be deformed until R5s=R5, as the balls compress the resilient portion.

If the stabilizing portion 5s is resilient, it can comprise a elastomeric material having the required compressibility at the intended service temperature. As discussed supra, it can have a radius, R5s, equal to the radius, R5 of the cylindrical proximal portion of the inner mandrel, or the radius, R5s can be larger than R5. In this case, the resilient stabilizing portion can form a bulge, and possibly define cradles to accommodate the balls. Upon application of a stress higher than a predefined threshold, the resilient stabilizing portion can be further deformed until it defines a radius smaller than or equal to R2−D, so that the outer tube can translate along and rotate about the longitudinal axis, X1.

Alternatively, the resiliency of the stabilizing portion can be achieved structurally. For example, as illustrated in FIGS. 4 to 6, the mandrel 5 is a hollow cylinder and the stabilizing portion 5s of the mandrel comprises longitudinal strips 6i, which are resiliently deforamble. The longitudinal strips are coupled to the inner mandrel at a first and a second ends thereof. The central portion of the at least one longitudinal strip may define a radius, R5s, wherein at rest, R5s≥R5. If the radius, R5s, is greater than the radius, R5 of the cylindrical proximal portion of the inner mandrel, the longitudinal strips form at rest an arch defining said radius, R5s, which can be deformed by the balls until the radius defined by the longitudinal strips becomes equal to R5. Upon application of a stress higher than a predefined threshold, the longitudinal strips can be further deformed until they define a radius smaller than or equal to R2−D, so that the outer tube can translate along and rotate about the longitudinal axis, X1.

Example 2

In an alternative embodiment illustrated in FIG. 7, the kit further comprises an intermediate tube 58 defined by an intermediate tube wall and having a distal portion 58d which can be inserted into the outer tube bore from the proximal end of the outer tube 8. The intermediate tube comprises protrusions 7p extending radially over a height, Dp, from a tip to a base rigidly coupled to a resiliently flexible longitudinal strip 58s forming a portion of the intermediate tube wall and coupled in cantilever to a proximal portion 58p of the intermediate tube. The radial height, Dp, of the protrusions may be defined as, (Dp+R8b) comprised between 90 and 105% of R24, wherein R8b is the outer tube bore radius and R24 is the distance between the longitudinal axis X1 and the bottom of the recesses 4. The outer tube 8 is identical to the outer tube described in Example 1. The insert portion 8i of the outer tube 8 therefore comprises circular through holes 9 having a diameter allowing the engagement therethrough of the protrusions 7p.

In this embodiment of the invention, the coupling of the metal rod to the ceramic element 1 proceeds as follows. The insert portion 8i of the outer tube is first inserted in the ceramic bore 2 until the through holes face the recesses 4 of the ceramic bore. Again, a flange 14 is advantageously provided between the insert portion 8i and the jutting portion 8p of the outer tube. Such flange consequently abuts against the ceramic element when the through holes in the outer tube face the recesses in the ceramic bore. The angular orientation of the outer tube with respect to the positions of the recesses can be indicated by appropriate markings on both outer tube (e.g., on the flange) and on the ceramic element.

Figures 7A, 7B, 7C:
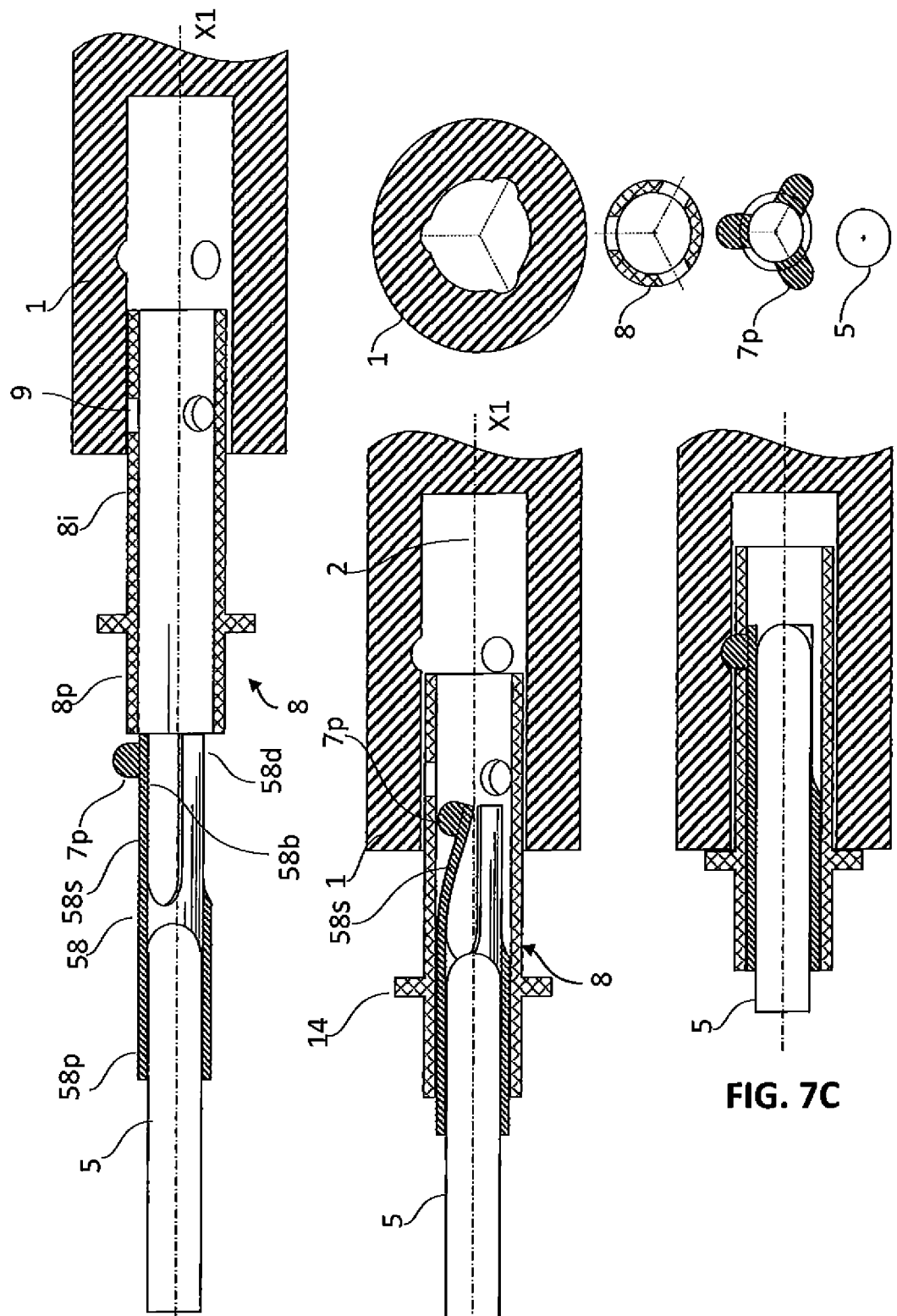
FIG. 7 shows the embodiment of the kit of parts described in Example 2.

The distal portion 58d of the intermediate tube 58 is then engaged in the outer tube bore with the longitudinal strips 58s comprising the protrusions 7p being inwardly bended, as illustrated in FIG. 7(b), such that the protrusions fit inside the outer tube bore, until they reach the level of the through holes. At this stage, the flexural stress on the longitudinal strips is released as the protrusions can move radially up through the through holes and engage into the recesses, as illustrated in FIG. 7(c). Once the protrusions 7p are engaged in the circular through holes and in the recesses 4, the inner mandrel 5, with its radius R5 substantially equal to the intermediate tube bore radius, R58b, can be inserted into the intermediate tube bore 58b from the proximal portion 58p of said intermediate tube 58. The protrusions 7p are thus stabilized in the recesses 4.

Again, if the stabilization portion of the inner mandrel is rigid, then a rigid mechanical coupling is formed between the outer tube and the ceramic element. If the stabilization portion of the inner mandrel is resiliently flexible, then upon application of a stress above a threshold value, the protrusions may withdraw from the recesses by the bending of the longitudinal strips. The threshold value can be controlled by selecting the compressibility of the inner mandrel. As discussed with respect to Example 1, resiliency of the stabilization portion can be achieved by selecting resilient materials and/or by designing a resilient structure.

Example 3

As shown in FIG. 8, in an alternative embodiment of the kit of parts according to the invention, the outer tube 8 does not comprise any through hole, but instead comprises protrusions 7p extending radially over a height, Dp, from a tip to a base rigidly coupled to resiliently flexible longitudinal strips 8s forming a portion of the outer tube wall of the insert portion 8i of the outer tube and coupled in cantilever to the proximal portion 8p of the outer tube. The radial height, Dp, of the protrusions may be defined so that (Dp+R8) is comprised between 90 and 105% of R24, wherein R8 is the outer tube wall radius and R24 is the distance between the longitudinal axis X1 and the bottom of the recesses 4.

In this embodiment of the invention, the coupling of the metal rod to the ceramic element 1 proceeds as follows. The insert portion 8i of the outer tube is first inserted in the ceramic bore 2 with the longitudinal strips comprising the protrusions 7p being inwardly bended, as illustrated in FIG. 8(*b*), such that the protrusions fit inside the cylindrical ceramic bore 2, until they reach the level of the recesses 4. At this stage, the flexural stress on the longitudinal strips is released as the protrusions can move radially up as they engage into the recesses, as illustrated in FIG. 8(*c*). Again, a flange 14 is advantageously provided between the insert portion 8i and the jutting portion 8p of the outer tube. Such flange consequently abuts against the ceramic element when the through holes in the outer tube face the recesses in the ceramic bore. The angular orientation of the outer tube with respect to the positions of the recesses can be indicated by appropriate markings on both outer tube (e.g., on the flange) and on the ceramic element.

Once the protrusions 7p are engaged in the recesses 4, the inner mandrel 5, with its radius R5 substantially equal to the outer tube bore radius, R8*b*, can be inserted into the outer tube bore 8*b* from the proximal portion 8p of said outer tube 8. The protrusions 7p are thus stabilized in the recesses 4. Again, if the stabilization portion of the inner mandrel is rigid, then a rigid mechanical coupling is formed between the outer tube and the ceramic element. If the stabilization portion of the inner mandrel is resiliently flexible, then upon application of a stress above a threshold value, the protrusions may withdraw from the recesses by the bending of the longitudinal strips. The threshold value can be controlled by selecting the compressibility of the inner mandrel. As discussed with respect to Example 1, resiliency of the stabilization portion can be achieved by selecting resilient materials and/or by designing a resilient structure.

Example 4

Figure 9A:
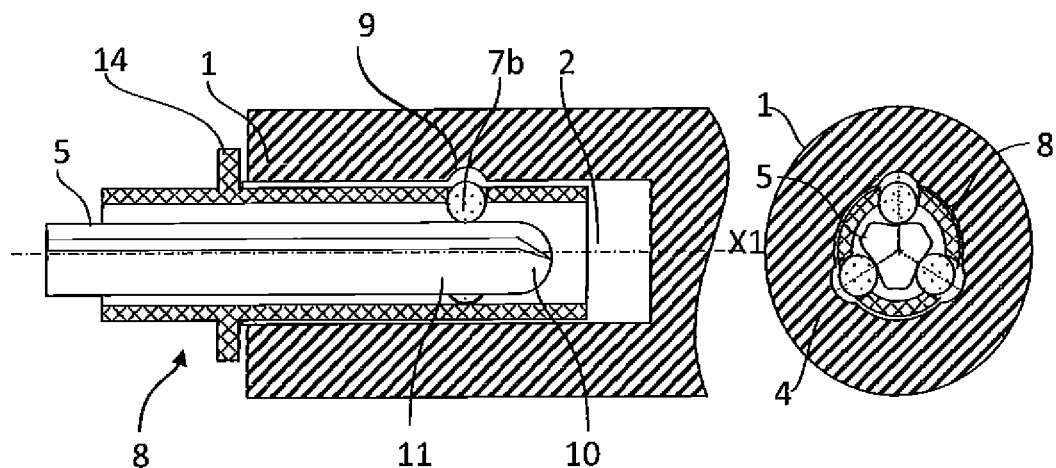
FIG. 9 shows the embodiment of the kit of parts described in Example 4.
Figure 9B:
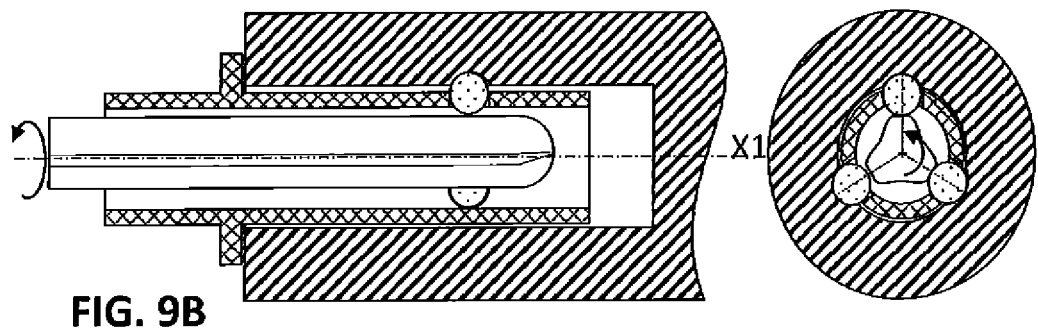
Figure 9C:
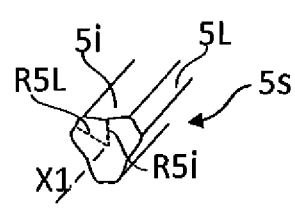

In FIG. 9, an embodiment of a kit of parts for mechanically coupling a ceramic element 1 to a metal rod according to the invention is represented. In this kit, the cylindrical bore wall comprises three recesses 4 located in the same transverse plane normal to the longitudinal axis, X1, the three recesses being evenly distributed over a circumference of said cylindrical ceramic bore. The outer tube 8 is identical to the outer tube described in Examples 1&2, with a cylindrical portion 8c comprising three through-holes 9. The projecting members 7b comprise three substantially spherical balls having a ball diameter, D, which can be engaged into the recesses 4 of the ceramic element through the three corresponding through holes 9 of the outer tube wall. The three through holes 9 have a diameter larger than the ball diameter, D. The three balls can thus be lodged within the outer tube bore as the outer tube is being inserted into the cylindrical ceramic bore, and can be engaged into the corresponding recesses through the through holes when the through-holes face the corresponding recesses. Like in Example 1 of the invention where the projecting members are balls 7b, the recesses 4 are advantageously substantially spherical and have a radius of curvature smaller than, or substantially equal to, the radius, D/2, of the spherical balls 7b. In a specific embodiment, the recesses and the substantially spherical balls have the same radius of curvature.

As shown in FIG. 9(*c*), the inner mandrel 5 has a specific geometry comprising a stabilizing portion 5s having a cross-section which is not a geometry of revolution, but which is preferably axisymmetric with respect to the longitudinal axis of the inner mandrel. For a system comprising N balls 7b, the cross-section of the stabilizing portion 5s comprises N locking surfaces 5L with a radial dimension R5L, and N insertion surfaces, 5i, having a radial dimension R5*i*<R5L. In FIG. 9, N=3. These locking surfaces, 5L, and insertion surfaces, 5i, are evenly distributed in alternating sequence over a circumference of said inner mandrel 5.

The ball diameter, D, is such that R8*b*<(D+R5*i*)<R2, with R8*b* being the radius of the outer tube bore and R2 being the radius of the cylindrical ceramic bore 2 as explained above. The ball may be made of metal, but it can be made of a ceramic material or, depending on the intended service temperature, in a polymeric material.

In this embodiment of the invention, the coupling of the metal rod to the ceramic element 1 proceeds as follows. The inner mandrel 5 is first introduced into the outer tube bore to a depth where the stabilizing portion 5s of the mandrel faces the through holes 9 of the outer tube, and with an angular orientation such that the insertion surfaces 5i of the stabilizing portion 5d face the through holes 9. The balls 7b can then be introduced through the through holes 9 to rest on the corresponding three insertion surfaces 5i. The balls must not jut out of the outer tube wall through the corresponding through holes 9 by more than the tolerance, δ=(R2−R8) so that the assembly composed of the outer tube, inner mandrel and balls can be inserted into the cylindrical ceramic bore. Consequently, the ball diameter, D≤(R2−R5*i*). On the other hand, the balls shall not roll freely over the insertion surface of the inner mandrel, as the inner mandrel is in the outer tube bore. For this reason, the ball diameter, D≥(R8*b*−R5*i*). Consequently, the ball having a diameter D defined as, (R8*b*−R5*i*)≤D≤(R2−R5*i*), are blocked between the insertion surfaces and the through holes in which they are nested, and can therefore not move away from the insertion portion 5s. The balls can be radially secured in this position nested in the through holes 9 for the time necessary to insert the outer tube, inner mandrel and balls into the cylindrical ceramic bore, by using a magnet, by coating them with a grease which adheres to the surfaces in contact, or by using an adhesive strip wrapped around the outer tube at the level of the through holes.

The insert portion of the outer tube 8, with the inner mandrel engaged in the outer tube bore with balls 7b resting on the insertion surfaces 5i of the stabilizing cross section and nested in each corresponding through hole 9, can be inserted into the cylindrical ceramic bore until the through-holes face corresponding recesses 4. A flange 14 is advantageously provided between the insert portion 8i and the jutting portion 8p of the outer tube. Such flange consequently abuts against the ceramic element when the through holes in the outer tube face the recesses in the ceramic bore. The angular orientation of the outer tube with respect to the positions of the recesses can be indicated by appropriate markings on both outer tube (e.g., on the flange) and on the ceramic element.

At this stage, the inner mandrel can be rotated about the longitudinal axis X1 with respect to the outer tube bore. Because of their diameter, D, as discussed supra, the balls cannot move away from the through holes as the inner mandrel is being rotated by an angle of 360°/2N. With N=3 balls in FIG. 9, the inner mandrel can be rotated by an angle of 60°. The rotation of the inner mandrel 5 serves to bring the balls from the insertion surfaces 5i onto the locking surfaces 5L of the stabilization portion 5s of the inner mandrel. The cross-section of the insertion portion must be such that the balls 7b can roll from an insertion surface to a locking surface as the inner mandrel is being rotated. The transition zones between an insertion surface and an adjacent locking surface are therefore preferably smooth, and should not have a radial dimension greater than R5L, lest the balls hitting the bottom surfaces of the recesses would block the rotation of the inner mandrel. During the rotation of the inner mandrel, the balls are moved radially outwards and engage into the recesses, as they roll from an insertion surface separated from the longitudinal axis, X1, by a distance, R5$i$, to a locking surface separated from the longitudinal axis, X1, by a distance, R5L>R5$i$. With R2<(R5L+D)≤R24, as the balls rest on a corresponding locking surface, they are engaged in the recesses and nested in the through holes of the outer tube, thus mechanically coupling the outer tube to the ceramic element.

Again, if the stabilization portion of the inner mandrel is rigid, then a rigid mechanical coupling is formed between the outer tube and the ceramic element. If the stabilization portion of the inner mandrel is resiliently flexible, then upon application of a stress above a threshold value, the protrusions may withdraw from the recesses by the bending of the longitudinal strips. The threshold value can be controlled by selecting the compressibility of the inner mandrel. As discussed with respect to Example 1, resiliency of the stabilization portion can be achieved by selecting resilient materials and/or by designing a resilient structure.

Concluding Remarks

As described supra, the present invention offers a reliable solution to mechanically coupling a metal rod to a ceramic element in a multitude of configurations. In particular, it allows mechanical coupling in translation and/or in rotation. The mechanical coupling can be rigid or resilient, simply by controlling the geometry and/or materials of the stabilizing portion 5$s$ of the inner mandrel. This allows an easy control of the threshold force required for reversibly disengaging the metal rod from the mechanical coupling with the ceramic element.

The present invention applies to any ceramic element regardless of whether it comprises a through bore or a blind bore. A mechanical coupling using a blind bore is advantageous as easier to achieve, and as separating the metal rod from any high temperature environment for which a ceramic element is used, thus reducing the thermal requirements on the metal used for the rod. A typical example is ceramic rollers of a conveying system as illustrated in FIG. 4, used for conveying goods through a high temperature oven. By limiting the penetration of the metal rods to a reduced length at both ends of a ceramic roller, the metal rods can be left out of the high temperature zone of the oven. Similarly, in stoppers for controlling the flow of metal melt out of a tundish, the metal rod does not necessarily penetrate into the ceramic stopper further than the level of the metal melt, thus reducing the temperature at which it is exposed.

Accordingly, the invention also relates to a kit of parts wherein said ceramic element is a conveyor roller 1 of a conveyor system for conveying products exposed to or being at a high temperature of at least 200° C., or at least 500° C.; or at least 800° C., and wherein the insert portion of the rod is exposed to a temperature of at least 150° C., or at least 200° C., or at least 300° C., and not more than 500° C., or not more than 400° C.

Various features and characteristics of the invention are described in this specification and illustrated in the drawings to provide an overall understanding of the invention. It is understood that the various features and characteristics described in this specification and illustrated in the drawings can be combined in any operable manner regardless of whether such features and characteristics are expressly described or illustrated in combination in this specification. The Inventor and the Applicant expressly intend such combinations of features and characteristics to be included within the scope of this specification, and further intend the claiming of such combinations of features and characteristics to not add new matter to the application. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with the written description requirement under 35 U.S.C. § 112(a). The invention described in this specification can comprise, consist of, or consist essentially of the various features and characteristics described in this specification.

LIST OF REFERENCES

1: ceramic element
2: ceramic bore
4: recess of the ceramic element
5: inner mandrel
5$i$: insertion surface of the inner mandrel
5L: locking surface of the inner mandrel
5$p$: cylindrical proximal portion of the inner mandrel
6$i$: longitudinal strips of the inner mandrel
7: projecting members
7$b$: balls as projecting members
7$p$: protrusion as projecting members
8: outer tube
8$c$: cylindrical portion of the outer tube
8$i$: insert portion of the outer tube
8$p$: jutting portion of the outer tube
9: through hole in the outer tube
10: distal portion of the inner mandrel
11: frusto-conical intermediate portion of the inner mandrel sandwiched between the cylindrical proximal and distal portions of the mandrel
14: flange
58: intermediate tube
58$s$: flexible longitudinal strip of the intermediate tube
58$p$: proximal portion of the intermediate tube
D: ball diameter,
Dp: height of the protrusion
X1: longitudinal axis
R2: radius of the cylindrical ceramic bore
R24: distance between the longitudinal axis X1 of the ceramic and the closed end of the recess 4
R8$b$: radius of the cylindrical portion of the outer tube bore
R8: radius of the cylindrical portion defined by the outer tube wall
R5: radius of cylindrical proximal portion of the mandrel
R5L: radial dimension of the locking surface of the inner mandrel
R5$i$: radial dimension of the insertion surface of the inner mandrel
R5$s$: radius of the stabilizing portion of the inner mandrel
R5$d$: radius of the cylindrical distal portion 10
R58$b$: radius of the intermediate tube bore
P1: transverse plane normal to the longitudinal axis, X1,

The invention claimed is:

1. Kit of parts for mechanically coupling a ceramic element to a rod comprising an outer surface made of metal, wherein:
   (a) the ceramic element comprises a cylindrical ceramic bore having a radius R2 defined by a cylindrical bore wall and extending along a longitudinal axis, X1, wherein the cylindrical bore wall comprises at least one recess,
   and wherein the rod comprises:
   (b) an outer tube comprising a jutting portion adjacent to an insert portion, and further comprising:
      an outer tube wall made of metal and defining the outer surface of the rod, wherein a portion of the outer tube wall of the insert portion is cylindrical, extending along a tube axis from a proximal end of the jutting portion to a distal end of the insert portion, and having a radius, R8, mating the cylindrical ceramic bore,
      an outer tube bore, comprising a cylindrical portion of radius, R8b, said outer tube bore extending along the tube axis from the proximal end and over a whole length of the jutting portion and further extending over at least part of a length of the insert portion,
   (c) At least one projecting member comprising a projecting portion having a geometry insertable into the at least one recess of the ceramic element,
   (d) An inner mandrel extending along an axis and having radial dimensions suitable for being inserted into the outer tube bore, and comprising a cylindrical portion of radius R5, wherein R5≤R8b, wherein
   (e) The insert portion of the outer tube can be inserted into the ceramic bore with the projecting portion of the at least one projecting member engaged in the at least one recess, and with the jutting portion jutting out of the ceramic element, and wherein
   (f) The inner mandrel can be inserted into the outer tube bore from the proximal end of the outer tube, such that the projecting portion of the at least one projecting member is resiliently stabilized in the at least one recess by a stabilizing portion of said inner mandrel, and the rod is thus mechanically coupled to the ceramic element in that the outer tube cannot translate along the longitudinal axis, X1, with respect to the ceramic bore,
   wherein the stabilizing portion of said inner mandrel is radially resilient, such that the at least one projecting member can be dislodged from the at least one recess upon application onto the outer tube of a force greater than a predetermined threshold force required for decoupling the rod from the ceramic element.

2. Kit of parts according to claim 1, wherein the geometries of the at least one projecting member and of the at least one recess are such that, when said projecting member is engaged and stabilized in the at least one recess, the rod is mechanically coupled to the ceramic element such that the outer tube cannot rotate about the longitudinal axis, X1, with respect to the ceramic bore.

3. Kit of parts according to claim 2, wherein said ceramic element is a conveyor roller of a conveyor system for conveying products exposed to or being at a high temperature of at least 200° C., and wherein the insert portion of the outer tube is exposed to a temperature of at least 150° C., and not more than 500° C.

4. Kit of parts according to claim 1, wherein the rod comprises three or more projecting members, and wherein the cylindrical ceramic bore wall comprises three or more recesses, and wherein projections of the three or more recesses onto a transverse plane P1, normal to the longitudinal axis, X1, are evenly distributed over a circumference of a projection of said cylindrical ceramic bore onto the transverse plane P1.

5. Kit of parts according to claim 4, wherein said three or more recesses are located in a same transverse plane, normal to the longitudinal axis, X1.

6. Kit of parts according to claim 1, wherein the stabilizing portion of said inner mandrel has a geometry defining a resiliently deformable structure.

7. Kit of parts according to claim 6, wherein the stabilizing portion of said inner mandrel is in the form of a hollow tube.

8. Kit of parts according to claim 1 wherein the stabilizing portion of said inner mandrel comprises a resiliently deformable material.

9. Kit of parts according to claim 1, wherein,
   the at least one projecting member comprises a substantially spherical ball having a ball diameter, D, and
   the insert portion of the outer tube comprises at least one circular through hole having a diameter larger than the ball diameter, D.

10. Kit of parts according to claim 9, wherein the inner mandrel comprises,
    a cylindrical proximal portion having a radius, R5, and including the stabilizing portion,
    a cylindrical distal portion having a radius R5d, wherein R5d<R5, and
    a frusto-conical intermediate portion (11) sandwiched between the cylindrical proximal and distal portions, and
    wherein the ball diameter, D, is such that R8b<(D+R5d)<(R8+δ), wherein δ is the tolerance between the outer tube and the cylindrical ceramic wall, δ=(R2−R8).

11. Kit of parts according to claim 9, wherein the stabilizing portion of the inner mandrel comprises at least one longitudinal strip, which is resiliently deformable and which is coupled to the inner mandrel at a first and/or a second ends of the at least one longitudinal strip, and wherein a central portion of the at least one longitudinal strip defines a radius, R5s, wherein at rest, R5s≥R5, such that D≥(R24−R5s), wherein R24 is the distance between the longitudinal axis X1 and the bottom of the at least one recess, and wherein when exposed to a flexural stress, the longitudinal strip can bend, such as to reduce the radius R5s<R5.

12. Kit of parts according to claim 1, wherein the at least one projecting member consists of a protrusion, extending radially over a height, Dp, from a tip to a base rigidly coupled to a resiliently flexible longitudinal strip forming a portion of the outer tube wall of the insert portion of the outer tube, and wherein (Dp+R8) is comprised between 90 and 105% of R24, wherein R24 is the distance between the longitudinal axis X1 and a closed end of the at least one recess.

13. Kit of parts according to claim 1, wherein
    the kit of parts further comprises an intermediate tube comprising a proximal portion, a distal portion, an intermediate tube wall, and an intermediate tube bore, wherein the distal portion of the intermediate tube can be inserted into the outer tube bore from the proximal end of the outer tube,
    the at least one projecting member consists of a protrusion extending radially over a height, Dp, from a tip to a base rigidly coupled to a resiliently flexible longitudinal strip forming a portion of the intermediate tube wall in the distal portion of the intermediate tube, and wherein (Dp+R8b) is comprised between 90 and 105% of R24, wherein R24 is the distance between the longitudinal axis X1 and a closed end of the at least one recess, the insert portion of the outer tube comprises at least one circular through hole having a diameter allowing the engagement therethrough of the protrusion, and once the insert portion of the outer tube is inserted in the ceramic bore, and the intermediate tube is engaged in the outer tube bore with the protrusion engaged in the at least one circular through hole and in the at least one recess, the inner mandrel has the radius R5, such that it can be inserted into the intermediate tube bore from the proximal portion of said intermediate tube, to stabilize the protrusion in the at least one recess.

14. Kit of parts according to claim 1, wherein the cylindrical ceramic bore is a blind hole in said ceramic element.

15. Conveyor roller assembly for a conveyor system for conveying products exposed to or being at a high temperature of at least 200° C., said conveyor roller comprising:
- (a) a cylinder made of ceramic and extending along a longitudinal axis, X1, comprising a first end and a second end, each of the first and second ends being provided with a cylindrical ceramic bore defined by a cylindrical bore wall and extending along the longitudinal axis, X1, wherein the cylindrical bore wall comprises at least one recess,
- (b) a first and second rods extending along the longitudinal axis and being resiliently coupled to each of the first and second cylindrical ceramic bores, each of the first and second rods comprising:
- (c) an outer tube comprising an insert portion inserted in the corresponding cylindrical ceramic bore, which is adjacent to a jutting portion jutting out of the corresponding cylindrical ceramic bore, the outer tube further comprising:
    - an outer tube wall made of metal and defining the outer surface of the rod, wherein a portion of the outer tube wall of the insert portion is cylindrical, having a radius, R8, mating the cylindrical ceramic bore,
    - an outer tube bore comprising a cylindrical portion of radius, R8b, said outer tube bore extending along the longitudinal axis, X1, from the proximal end and over a whole length of the jutting portion and further extending over at least part of a length of the insert portion,
- (d) at least one projecting member comprising a projecting portion engaged in the at least one recess of the cylinder, and
- (e) an inner mandrel inserted in the outer tube bore from the proximal end of the outer tube, such that the projecting portion of the at least one projecting member is resiliently stabilized in the at least one recess by a stabilizing portion of said inner mandrel, and the rod is thus mechanically coupled to the cylinder in that the outer tube cannot translate along the longitudinal axis, X1, with respect to the cylindrical ceramic bore, wherein the stabilizing portion of said inner mandrel is radially resilient, such that the at least one projecting member can be dislodged from the at least one recess upon application onto the outer tube of a force greater than a predetermined threshold force required for decoupling the rod from the cylinder.

* * * * *